Jan. 11, 1966 W. M. BROWN 3,228,169
AUTOMATIC CONTROL MEANS FOR SEALING MACHINE
Filed May 25, 1962 3 Sheets-Sheet 1

INVENTOR.
WARREN M. BROWN
BY
ATTORNEY

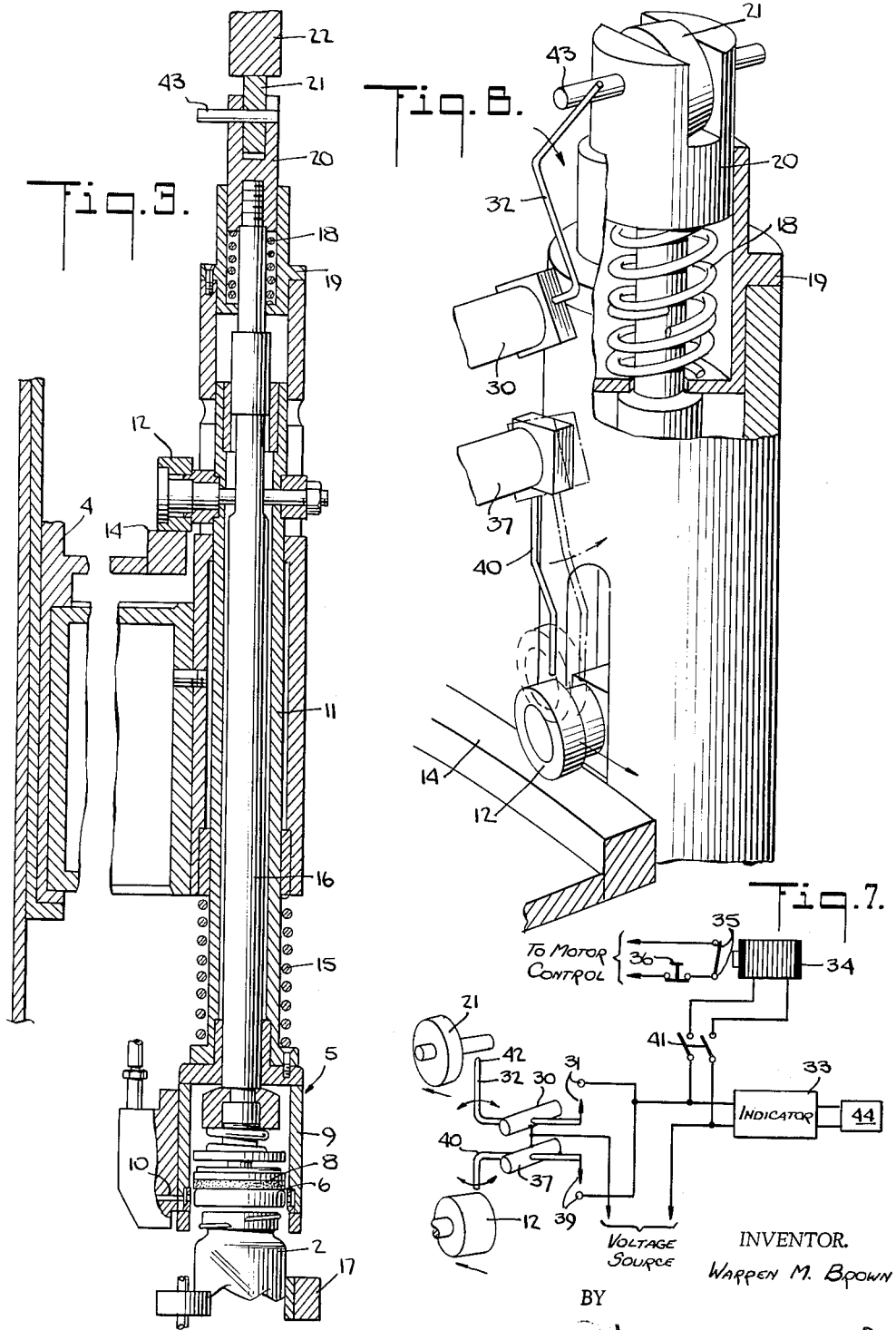

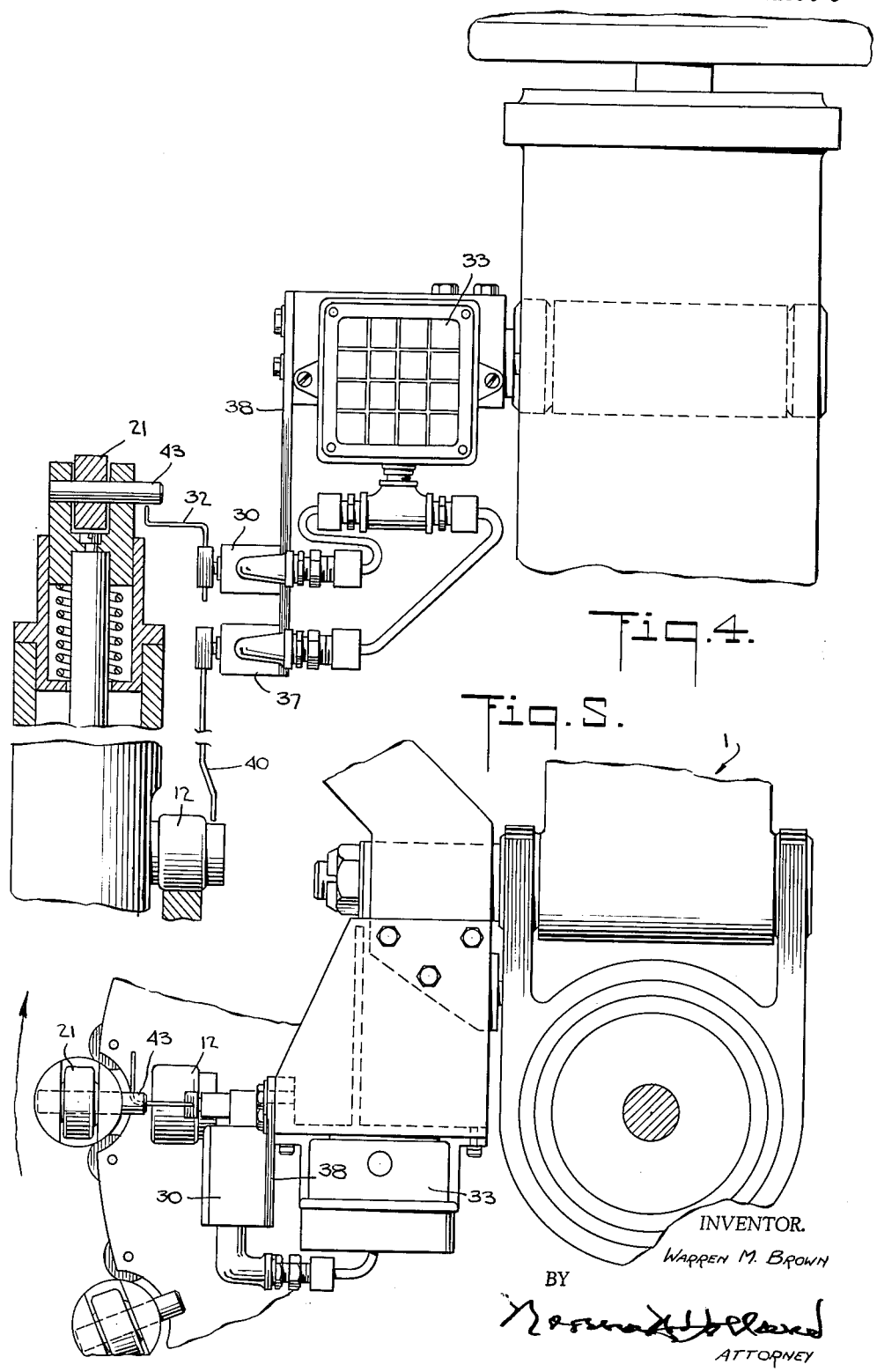

`United States Patent Office`

3,228,169
Patented Jan. 11, 1966

3,228,169
AUTOMATIC CONTROL MEANS FOR
SEALING MACHINE
Warren M. Brown, Lancaster, Ohio, assignor to Anchor Hocking Glass Corporation, Lancaster, Ohio, a corporation of Delaware
Filed May 25, 1962, Ser. No. 197,777
3 Claims. (Cl. 53—78)

The present invention relates to container sealing machines and more particularly to an automatic control means for a sealing machine adapted to detect faulty machine operation and to provide an automatic warning and stop signal when such faulty operation occurs.

High speed container sealing has been made practical by the use of automatic sealing machines which operate with great precision and at extremely high speeds. Such sealing machines, for example, are disclosed in United States Patents Nos. 2,510,568 and 2,610,779 and United States patent applications Serial Nos. 803,508 and 804,150 now U.S. Patents Nos. 3,040,492 and 3,073,090, respectively, all owned by the assignee of the present invention. These sealing machines are of the rotary type wherein a series of sealing heads move continuously about a circular path and above a line of moving containers positoned therebelow on an arcuate conveyor. The sealing heads continuously engage and apply closure caps to containers on the conveyor.

As is the case with all automatic machinery, one of these heads may fail to operate properly due to the failure of one of the components of the sealing head structure or due to the accidental presence of some foreign object in the machine. When a head thus does fail to operate properly, containers may be passed out of the machine which are improperly sealed. In addition, improper functioning of the sealing heads may result in the smashing of containers or even of other parts of the sealing machines due to a displacement of the machine parts and due to a jamming-up of containers and closures. A jam-up in the sealing machine is objectionable due both to the possibility of damage to the machine itself and also due to the interruption of the packaging operation which may result in serious delay and costly spoilage of the product being packed.

Even though the above described faulty operations occur only very infrequently in well designed and carefully operated sealing machinery, it is desirable that even such infrequent faulty operations be immediately detected. When packaging food, for example, it is highly desirable that faulty packages be kept at an absolute minimum to avoid any consumer discontent which may result from the spoilage of even a single package. It is also possible that even an infrequent failure may occur during a critical packing run so that a carefully timed and integrated packing operation is interrupted thereby jeopardizing the success of a particular product packing operation. For these reasons, the automatic control means of the present invention is of extreme importance and of great value on packing machinery even though it may operate only at infrequent intervals. When the device does detect and signal faulty operation, this detection will provide a significant saving of time and money to the packer and it will avoid possible embarrassment and consumer ill will resulting from inproperly sealed containers.

Accordingly, an object of the present invention is to provide an improved sealing machine.

Another object of the present invention is to provide an automatic means for the detection of faulty sealing machine operation and for the automatic shut down of the machine when fauly operation occurs.

Another object of the present invention is to provide an improved, reliable automatic control adapted for use on present types of sealing machines.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a detailed vertical sectional view of a sealing head illustrating the control means of the invention;

FIG. 4 is an enlarged elevational detailed view partially in section of the control means in accordance with the invention;

FIG. 5 is a top plan view of the control means of FIG. 4;

FIG. 6 is a detailed perspective view of the sensing means in accordance with the present invention; and FIG. 7 is a schematic illustrating the control circuit.

Figure 1:
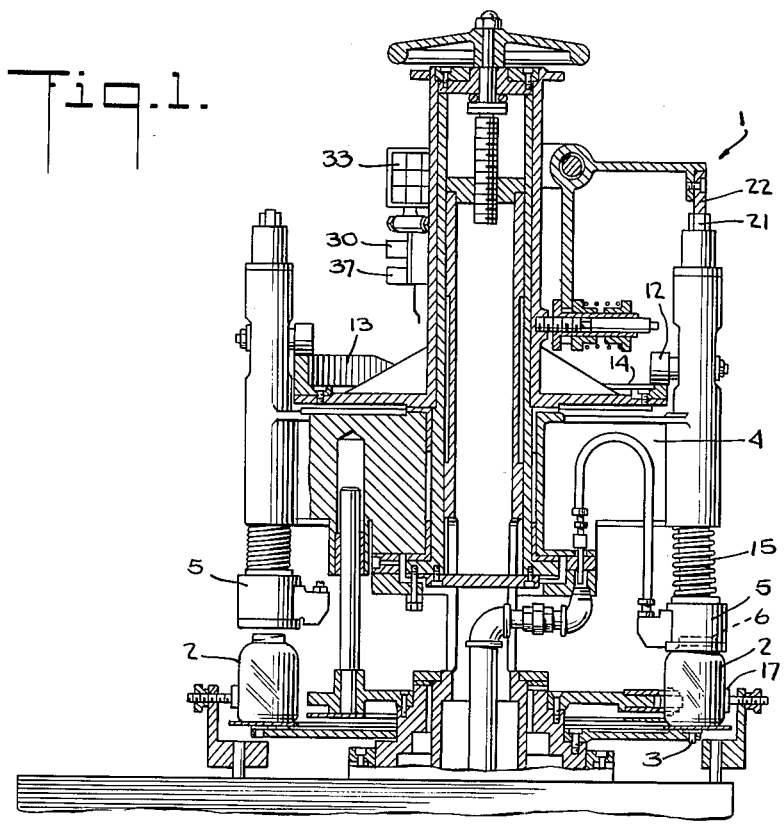
FIG. 1 is a vertical sectional view of a rotary sealing machine including the automatic control of the present invention taken along line 1—1 of FIG. 2.
Figure 2:
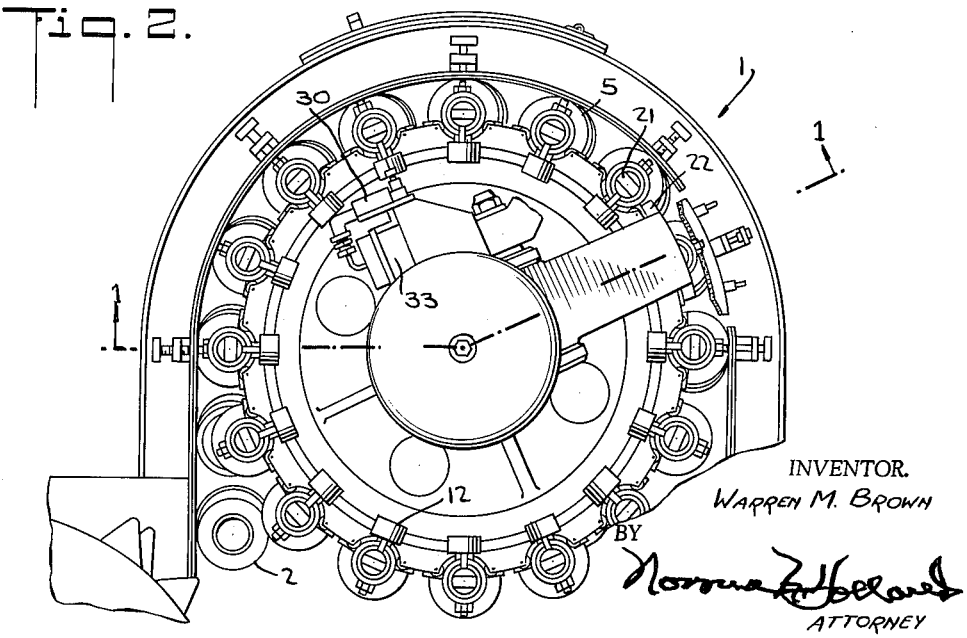
FIG. 2 is a top plan view of the machine of FIG. 1.

FIGS. 1 and 2 illustrate a rotary sealing machine 1 of the type wherein containers 2 are moved along an arcuate path by a conveyor means 3 beneath a rotating turret 4 mounting several sealing heads 5. Each sealing head 5 picks up a cap 6 from a cap feed using a suitable magnet or other cap holding means and applies the closure cap 6 to a moving container 2 by pressing or screwing the cap 6 onto the top of the container 2. The sealing heads 5 may be used to apply screw caps in which case the caps or the containers are rotated during the cap application or the machine may be used to apply press-on caps by a straight downward movement of a cap applying plunger. Such machines are fully described, for example, in the above mentioned United States patents and applications and the sealing machine will be described herein only in so far as is necessary to describe the novel automatic control means and to make clear its method of operation.

The normal operation of the individual sealing heads 5 of a machine 1 in applying caps 6 to the containers 2 will first be described with particular reference to FIG. 3 to facilitate the description of possible faulty operation which follows. The sealing heads 5 are mounted on a suitable turret 4 which carries the heads 5 in a vertical position and around a circular path causing a chuck 8 on the lower end of the sealing head 5 to position each closure cap 6 above the mouth of a container 2 carried along a similar path by conveyor 3 (FIG. 1). After the cap 6 has been moved into position above the container 2 by the head 5, a jacket 9 is lowered over the container top to permit the injection of steam or inert gas or a vapor-gas mixture into the container 2 head space through suitable outlets 10 in the jacket 9. The jacket 9 is lowered into the injection position by the hollow support spindle 11 whose vertical position is controlled by the cam roller 12 which rides on a circular cam 13. A depressed portion 14 (FIG. 1) is provided on the circular cam 13 to cause the jacket 9 to be lowered to its injection position as illustrated in FIG. 3 under the force of a compressed coil spring 15.

After the jacket 9 has been lowered and the steam or inert gas injected under the cap 6 and into the container 2 headspace, the cap 6 is applied by the lowering of the chuck 8 and its vertical chuck support spindle 16. The chuck support spindle 16 is normally held in a raised position by the compressed coil spring 18 mounted between the spring support collar 19 and the top 20 of the chuck support spindle 16. The chuck support spindle 16 and the connected chuck 8 are lowered to apply the closures by a cam roller 21 rotatably mounted on the top of the chuck support spindle 16 and positioned to engage an arcuate cam 22 best illustrated in FIGS. 1 and 2.

In FIG. 3 the sealing machine is applying screw caps and relative rotation between the cap 6 and the container 2 is obtained by causing the container 2 to engage and roll along a stationary shoe 17. If desired the spindle 16 may be rotated and the container held against rotation. In the position illustrated in FIG. 3, the container 2 has started to rotate and cam 22 has begun to lower the spindle 16 and the chuck 8 downwardly to move the cap 6 onto the turning container finish. A condensable vapor such as steam or an inert gas or a vapor gas mixture is being injected into the container headspace from outlets 10 in the hood 9.

During normal operation of the sealing machine 1, the two coil springs 15 and 18 and the two cams 13 and 22 cooperate to correctly position the jacket 9 and the cap applying chuck 8 at the proper heights so that they move in predetermined paths during the closure pick-up, the vapor or gas injection, and the closure application operations as described above.

When, however, a failure occurs in one of the head positioning parts such as the springs, or cams or in the head lubrication, the jacket support spindle 11 or the chuck support spindle 16 fail to move to their proper positions resulting in improper operation of the sealing machine. If the jacket 9, for example, is not moved down to its proper injection position, the desired vacuum or inert atmosphere is not obtained in the container headspace resulting in an improper seal and possible product spoilage. If the sealing chuck 8 remains in a depressed position due to a part failure such as the fracture of the coil spring 18 as illustrated in FIG. 6, the chuck 8 will operate improperly during the cap pick-up operation and may also strike and upset or damage the glass containers as the containers 2 move beneath the heads 5 on their travel around the arcuate portion of the container conveyor path.

The automatic control means of the present invention detects these failures and provides an indication and a machine control stop signal when such failures occur as will now be described.

The control means includes a sensing means for detecting faulty operation of the chucks 8 and jackets 9. The jacket position sensing member comprises a switch 37 having normally open contacts 39 (FIG. 7) which are closed by rotational movement of a detecting arm 40 as best illustrated in FIG. 6. Detecting arm 40 is positioned to be rotated in a counterclockwise direction (FIG. 6) in the event that the cam roller 12 is spaced above the lower portion 14 of the circular cam 13 as a result of the failure of the jacket support spindle 11 to move downwardly to the injection position. The cam roller 12 when thus raised improperly as illustrated in dash-dot lines in FIG. 6 swings the switch arm 40 to the position also illustrated in dash-dot lines thereby closing the contacts 39 of the switch 37 to energize an indicator 33 which may be a horn or lamp or other suitable danger signal and also causing a control relay 34 to open its normally closed contacts 35 which may be connneected in series with the regular sealing machine drive motor stop button 36, for example, to automatically stop the machine operation. The automatic stop switch 41 is closed when the automatic stop operation of relay 34 is being used.

The sensing means for the chuck support spindle 16 is operated by the failure of the chuck support spindle 16 to return upwardly to its normal raised position. The preferred embodiment comprises a switch 30 mounted above the above described switch 37 on a suitable bracket 38 and having a pair of normally open contacts 31 controlled by a pivotally mounted detector arm 32. The upper end 42 of the detector arm 32 is positioned adjacent to the path of the mounting shaft 43 for cam roller 21. This upper end 42 of the detector arm 32 is positioned so that it will be engaged by the shaft 43 when a chuck support spindle 16 fails to rise either through the failure of the coil spring 18, a seizing of a bearing of the chuck support spindle 16 or a jamming due to the entry of foreign matter into the machine. This engagement of the detector arm 32 by the shaft 43 rotates it in a clockwise direction as illustrated in FIG. 6 to close the switch contacts 31 to energize the indicator 33 and also when automatic stop switch 41 is closed to energize the control relay 34 whose normally closed contacts 35 are coupled in series with the sealing machine motor stop button 36.

The indicator 33 may include a counter 44 to record the number of faults detected. This will give a record of the machine operation and also indicate the number of possible improper seals where the automatic stop switch 41 is open and the machine is not turned off immediately upon the operation of the fault indicator 33.

It will be seen that the automatic control of the present invention provides a means for promptly indicating the malfunction of the sealing machine with respect to the critical operating cycles of the sealing chucks and the gas or vapor injection hoods. As soon as either of these elements are improperly positioned during a sealing cycle, a prompt indication is obtained permitting the machine to be stopped by the operator or alternatively the fault sensing mechanism may be set up to automatically stop the machine operation. This prompt indication protects the machine against possible damage and also minimizes the possibility of having improperly sealed containers.

The automatic control means described above is adapted for use on both new and presently used rotary sealing machines and thus it permits the advantages of automatic protection to not only be included in new machines but also to be applied to existing machines to adapt them for automatic and continuous surveillance and control. The control system is positive in operation and easily adjusted and serviced and is also rugged and relatively inexpensive so that it may be used without requiring an appreciable investment on all such rotary sealing devices to protect their operation and also to assure the quality of the sealed product. The use of this automatic control system facilitates the inspection of the sealed containers by reducing sealing failures and reduces the number of rejects thereby decreasing wastage and reject handling cost.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a container sealing machine the combination of a first member for applying a closure cap to a container, a second member for forming a sealing chamber around a portion of a container, means for moving said first and second members through predetermined closed paths, means for moving said first member between upper and lower positions on its closed path, means for moving said second member between upper and lower positions on its closed path, a first sensing means located adjacent said path for said first member for detecting the failure of said first member to move between its upper and lower positions, a second sensing means located adjacent said path for said second member for detecting the failure of said second member to move between its upper and lower positions, and means cooperating with both of the sensing means for indicating a failure of either of said members.

2. The combination defined in claim 1 wherein said indicating means comprises a circuit activated by said sensing means for stopping the means for moving the first and second members through closed paths.

3. In a container sealing machine the combination comprising a rotatably mounted turret, a plurality of sealing heads mounted on said turret for movement in a predetermined closed path, each of said turrets having a cap applying member for applying a closure cap to a container and a hood member for forming a sealing chamber around a portion of a container, means for moving said sealing heads through the predetermined closed path, a cam follower on each cap applying member and a cam follower on each hood member, a first cam for engaging each cap applying member cam follower and for moving each cap applying member from an upper position to a lower position, means for returning each cap applying member to the upper position, a second cam for engaging and moving each hood member from a lower position to an upper position, means for returning each hood member to the lower position, a first detector located adjacent said path for detecting the failure of a cap applying member to move from its lower position to an upper position, a sound detector located adjacent said path for detecting the failure of said hood member to move from its upper position to a lower position, and indicator means coupled to said detectors.

References Cited by the Examiner

UNITED STATES PATENTS

| | | | |
|---|---|---|---|
| 1,735,761 | 11/1929 | Huey | 192—129.2 |
| 1,848,827 | 3/1932 | Flink et al. | 53—77 X |
| 2,285,283 | 6/1942 | Jones | 53—77 X |
| 2,338,852 | 1/1944 | Hohl et al. | 53—77 X |
| 2,351,888 | 6/1944 | Stewart | 53—78 X |
| 2,570,956 | 10/1951 | Kronquest | 53—95 X |
| 2,610,779 | 9/1952 | Fouse | 53—87 |

FRANK E. BAILEY, *Primary Examiner.*

TRAVIS S. McGEHEE, *Examiner.*